US 11,829,975 B1

(12) United States Patent
Fischer et al.

(10) Patent No.: US 11,829,975 B1
(45) Date of Patent: Nov. 28, 2023

(54) USER CATEGORIZATION OF TRANSACTIONS AT MOMENT-OF-SALE USING MOBILE PAYMENTS

(71) Applicants: Sam Fischer, Mountain View, CA (US); Rebecca Gilbert, San Jose, CA (US); Jon Fasoli, Mountain View, CA (US)

(72) Inventors: Sam Fischer, Mountain View, CA (US); Rebecca Gilbert, San Jose, CA (US); Jon Fasoli, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 1322 days.

(21) Appl. No.: 15/965,668

(22) Filed: Apr. 27, 2018

(51) Int. Cl.
*G06Q 20/20* (2012.01)
*G06Q 40/12* (2023.01)
*G06Q 30/0601* (2023.01)
*G06Q 20/32* (2012.01)
*G06Q 20/38* (2012.01)

(52) U.S. Cl.
CPC ....... *G06Q 20/204* (2013.01); *G06Q 20/3221* (2013.01); *G06Q 20/3223* (2013.01); *G06Q 20/389* (2013.01); *G06Q 30/0641* (2013.01); *G06Q 40/125* (2013.12)

(58) Field of Classification Search
CPC ............. G06Q 20/389; G06Q 30/0641; G06Q 20/204; G06Q 40/125; G06Q 10/10; G06Q 20/3221; G06Q 20/08; G06Q 30/016; G06Q 40/02; G06Q 40/12; G06Q 20/20; G06Q 20/202; G06Q 20/40; G06Q 20/10; G06Q 20/26; G06Q 20/34; G06Q 20/36; G06Q 20/209; G06F 3/0482; G06F 3/0488; G02F 1/0054
See application file for complete search history.

(56) References Cited

U.S. PATENT DOCUMENTS

| | | | |
|---|---|---|---|
| 8,359,239 B1 * | 1/2013 | Cook .................. | G06Q 30/04 705/19 |
| 2004/0108376 A1 * | 6/2004 | Witherspoon ......... | G06Q 20/04 235/379 |
| 2007/0265861 A1 * | 11/2007 | Meir-Levi ............. | G06Q 40/02 379/91.01 |

(Continued)

*Primary Examiner* — Peter Ludwig
*Assistant Examiner* — Avia Salman
(74) *Attorney, Agent, or Firm* — Ferguson Braswell Fraser Kubasta PC

(57) ABSTRACT

The invention relates to a method for allowing users to categorize transactions at moment-of-sale using mobile payments. The method includes detecting a transaction performed on a mobile device. The method further includes prompting, a user of the mobile device to provide a categorization of the transaction as a business transaction or a personal transaction, where the transaction is categorized by the user contemporaneously with the transaction being detected by the FMA interface. The method further includes receiving the transaction and the categorization of the transaction from the user. The method further includes sending the FMA time stamp of the transaction with the categorization as the business transaction, Finally, the method includes matching the FMA time stamp of the business transaction to a financial institution time stamp of a pending transaction.

20 Claims, 8 Drawing Sheets

(56) References Cited

U.S. PATENT DOCUMENTS

| | | | | |
|---|---|---|---|---|
| 2009/0321522 A1* | 12/2009 | Lohr | ................ | G06Q 20/20 |
| | | | | 235/462.13 |
| 2014/0006198 A1* | 1/2014 | Daly | ................ | G06Q 30/06 |
| | | | | 705/24 |
| 2015/0294316 A1* | 10/2015 | Eisen | ................ | G06Q 40/12 |
| | | | | 705/30 |
| 2017/0300184 A1* | 10/2017 | Calles | ................ | G06Q 20/08 |
| 2017/0372282 A1* | 12/2017 | Sarin | ................ | G06Q 20/20 |

* cited by examiner

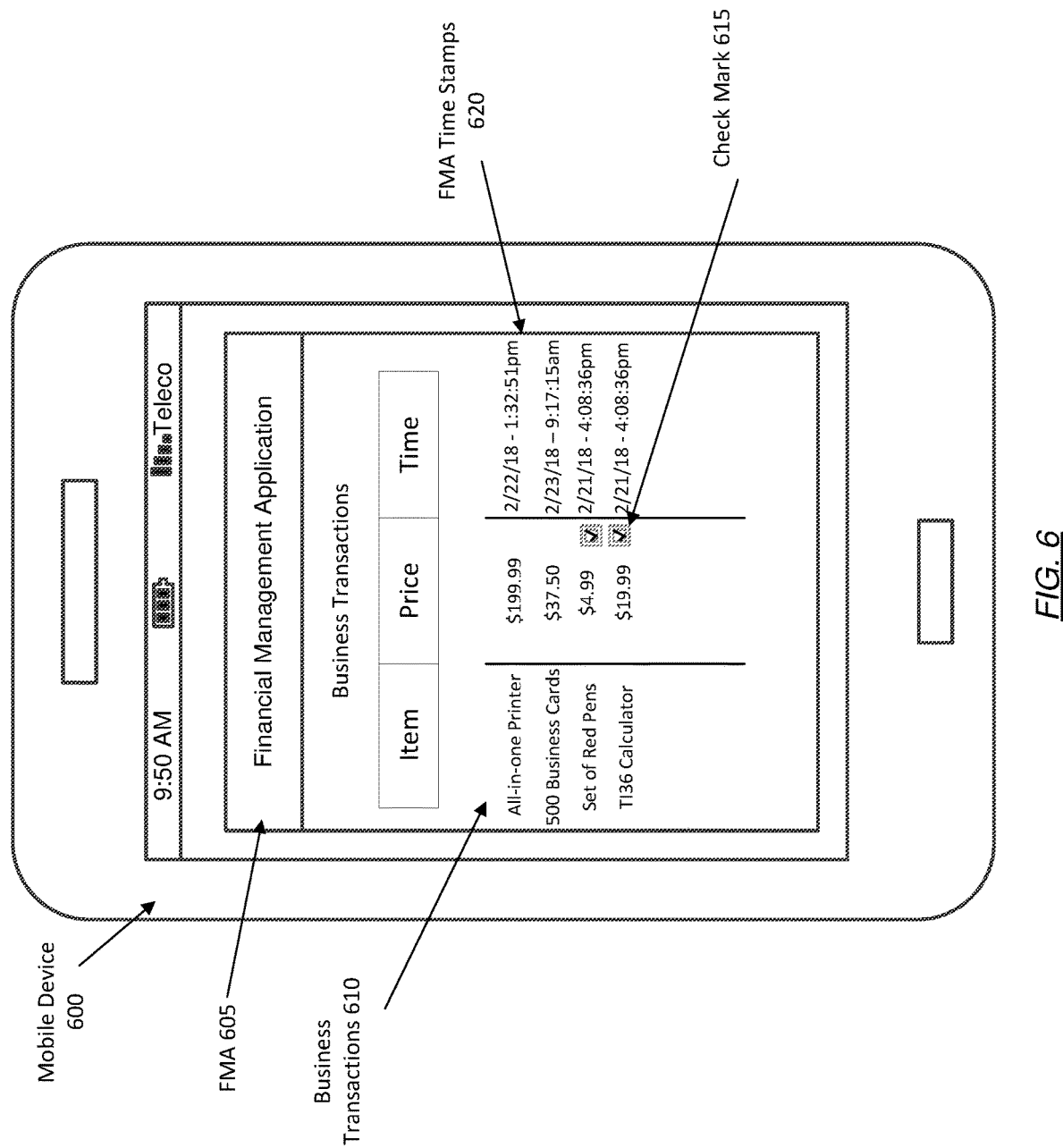

USER CATEGORIZATION OF TRANSACTIONS AT MOMENT-OF-SALE USING MOBILE PAYMENTS

BACKGROUND

Small business owners generally rely on a Financial Management Application (FMA) to keep track of the business transactions, revenue, expenses, etc. The FMA may be linked to a user's bank account, checking account, savings account, and credit card statements to track transactions performed by the user. Small business owners typically use the same bank account for both personal and business transactions. As a result, as the business transactions pile up throughout the year and time passes, it becomes harder to track which transactions were for business and which are personal.

A small business owner often does not have the time to backtrack and sort out which transactions are for business rather than personal. Accordingly, failure to timely track expenses becomes especially problematic when the time approaches to submit expense reports or file a tax return. When the tax filing deadline looms and expenses are not properly categorized at the time of the transaction, particularly when the transactions are still pending at a bank, business activities stop and time and resources of the business are redirected to backtrack through all the expenses for the year to provide adequate proof for the tax preparer of business expenses. Expense reimbursements and tax deductions could be missed, and unnecessary taxes paid if proper records are not timely maintained.

Other solutions have provided methods for tracking and categorizing transactions, but these transaction tracking and categorization methods tend to take place days after a transaction is performed, primarily to allow a bank to process and post the transaction. As a result, most small business owners simply forget or no longer have time to go back and categorize the transactions properly. However, as banking and tracking technology has advanced, recent innovations allow improved methods for tracking and categorizing transactions, such as tracking a transaction as a pending transaction as opposed to waiting days for the transaction to be posted by a bank. This advancement has been made possible by better accuracy and tracking methods involving the time stamp of a transaction.

SUMMARY

In general, in one aspect, one or more embodiments relates to a method comprising detecting, via a financial management application (FMA) interface, a transaction performed on a mobile device; prompting, via the FMA interface, a user of the mobile device to provide a categorization of the transaction as a business transaction or a personal transaction, wherein the transaction is categorized by the user contemporaneously with the transaction being detected by the FMA interface; receiving the transaction and the categorization of the transaction from the user, wherein the transaction comprises a FMA time stamp; sending, to the FMA via the FMA interface, the FMA time stamp of the transaction with the categorization as the business transaction; and matching the FMA time stamp of the business transaction to a financial institution time stamp of a pending transaction.

In general, in one aspect, one or more embodiments relates to a system comprising a processor configured to access a memory; a financial management application (FMA) stored in the memory, executing on the processor, and comprising functionality to: detect, via a financial management application (FMA) interface, a transaction performed on a mobile device; prompt, via the FMA interface, a user of the mobile device to provide a categorization of the transaction as a business transaction or a personal transaction, wherein the transaction is categorized by the user contemporaneously with the transaction being detected by the FMA interface; receive the transaction and the categorization of the transaction from the user, wherein the transaction comprises a FMA time stamp; send, to the FMA via the FMA interface, the FMA time stamp of the transaction with the categorization as the business transaction; and match the FMA time stamp of the business transaction to a financial institution time stamp of a pending transaction.

In general, in one aspect, one or more embodiments relates to a non-transitory computer readable medium comprising instructions to: detect, via a financial management application (FMA) interface, a transaction performed on a mobile device; prompt, via the FMA interface, a user of the mobile device to provide a categorization of the transaction as a business transaction or a personal transaction, wherein the transaction is categorized by the user contemporaneously with the transaction being detected by the FMA interface; receive the transaction and the categorization of the transaction from the user, wherein the transaction comprises a FMA time stamp; and send, to the FMA via the FMA interface, the FMA time stamp of the transaction with the categorization as the business transaction; and match the FMA time stamp of the business transaction to the financial institution time stamp of a pending transaction.

Other aspects of the invention will be apparent from the following description and the appended claims.

BRIEF DESCRIPTION OF DRAWINGS

FIGS. 3, 4, 5, and 6 show an example in accordance with one or more embodiments.

DETAILED DESCRIPTION

Figure 1:
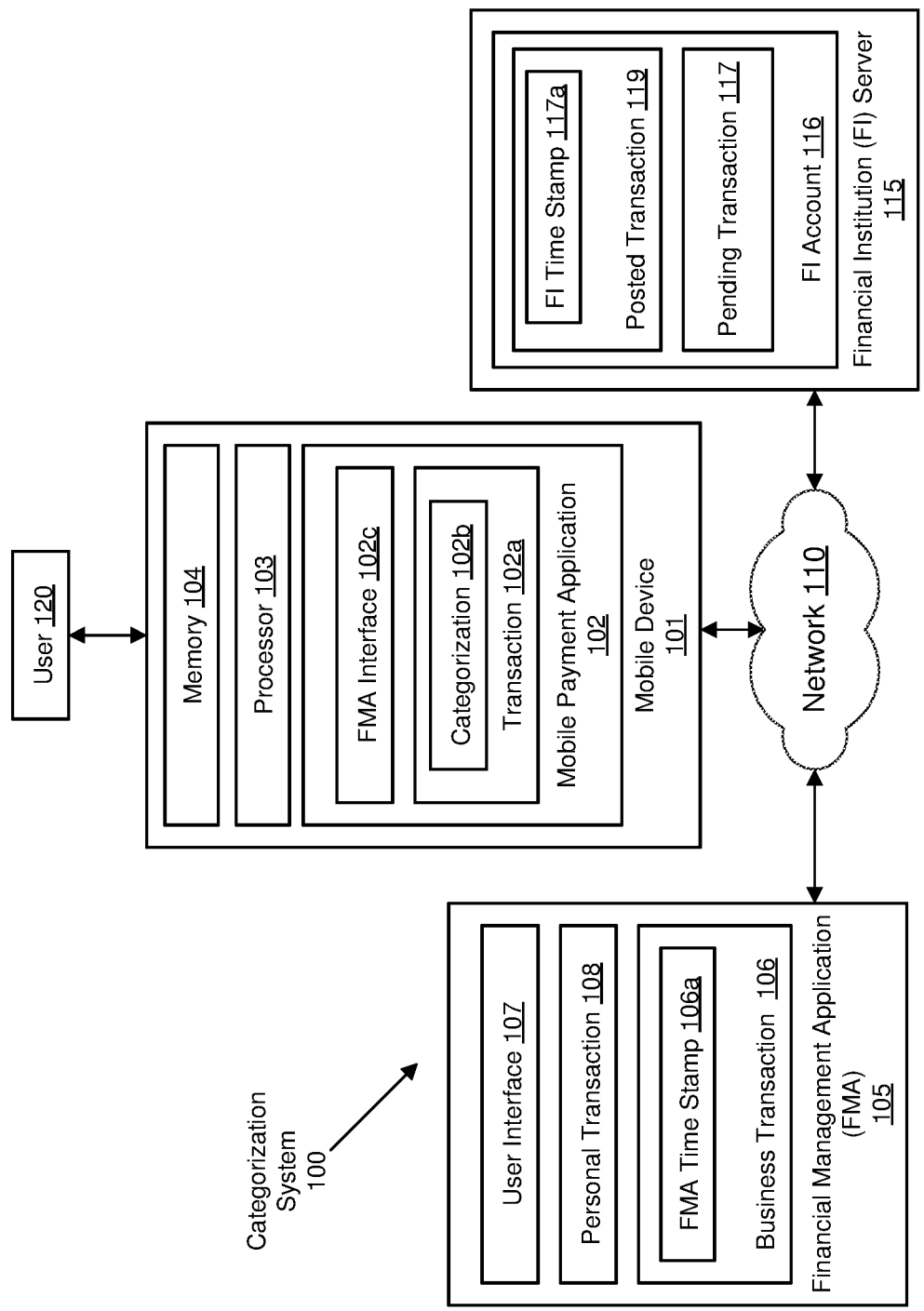
FIG. 1 shows a system for categorizing transactions at the moment-of-sale using smartphone payments in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention involve a method and system for allowing users to categorize transactions at moment-of-sale using mobile payments, such as those payments performed using a smart phone. Many people are using smart phones in lieu of credit cards, debit cards, checks, or cash to perform payments either online or in a store. For example, a user may visit a gas station to purchase fuel for the company car, make a beverage purchase inside the attached convenience store, and buy a newspaper inside the convenience store all while using the smart phone to make the purchases. In addition to the rising popularity of using smart phones to make purchases, the use of applications to track a user's finances is increasing. Financial applications allow a user to track expenses, interact with and track transactions of multiple bank accounts and credit cards, bills, and any other financial happenings of the user.

Small business owners, in particular, rely on using financial applications to track business expenses and keep track of revenue and profit of their business. Financial applications may be applications residing and executing on a smart phone to also keep track of any payments performed using the smart phone either in a store or online. In the example above, the newspaper and fuel purchased by the user may be marked as a business expense while the beverage may be marked as a personal expense. By integrating the financial application into the smart phone, the small business owner is able to mark expenses as personal or business in the financial application as these transactions are taking place and are still pending with a financial institution. Accordingly, the small business owner is able to maintain a timely record of all business expenses performed throughout the year without having to backtrack at some later date when the expenses or how to categorize the expense may have been forgotten.

Turning to FIG. 1, a categorization system (100) for allowing users to categorize transactions at moment-of-sale using smartphone payments, in accordance with embodiments, is shown. The categorization system (100) includes a user (120), who accesses a mobile device (101) which is linked to a financial management application (FMA) (105) and a financial institution (FI) server (115) of the user (120) via a network (110). The mobile device (101) also includes a processor (103) and memory (104) that includes functionality to allow the mobile payment application (102) to execute on the mobile device (101).

In one or more embodiments, the user (120) is an individual or a form of automated software that enters necessary prompts into a mobile device (101) via the FMA interface (102c), which is linked to a mobile payment application (102). Additionally or alternatively, the FMA interface (102c) may automatically enter the prompt based on past user selections. The categorization (102b) entered by the user (101) as well as any other information provided to the FMA (105) forms the basis for the business transactions (106) that is used by the FMA (105).

In one or more embodiments, a mobile device (101) is any device and/or any set of devices capable of electronically processing instructions and that includes at least the minimum processing power, memory, input and output device(s), network connectivity, and ability to process application content. Examples of the mobile device (101) include, but are not limited to a laptop computer, smart phone, personal digital assistant, tablet computer, point of sale (POS) device, and/or any other type of computing device.

In one or more embodiments, the mobile device (101) contains a mobile payment application (102). The user (120) is able to link a credit card, debit card, or bank account to the mobile payment application (102) to enable purchasing via the mobile device (101). The mobile payment application (102) allows for the user (120) to perform transactions (102a) at a store, on a merchant device (not shown), on an online merchant store, online merchant applications, or any other terminal that accepts transactions (102a). The mobile payment application (102), when used at a store for checkout, takes advantage of near-filed communication (NFC) devices in a mobile device (101). This is accomplished by enabling the NFC peer-to-peer communication on the mobile device (101). Some examples of the mobile payment application (102) may include Apply Pay, Google Pay, Samsung Pay, and Microsoft Wallet. These applications are merely just a few examples of applications found on a mobile device to allow payment for good and services using the mobile device, and many more examples similar to these may be used.

In one or more embodiments, the mobile payment application (102) is used for a transaction (102a). The transaction (102a) is a monetary exchange between a user and a merchant, another user, a third party, or any other person that accepts transactions. In one or more embodiments, the transaction (102a) is performed within a retail establishment when the user (120) using the mobile device (101) of the user (120). In one or more embodiments, the transaction (102a) is an automatic transaction set up by the user to be performed a certain number of times or performed on a certain day or repeated days. For example, the user (120) may set up a transaction (102a) for paper to be performed at the beginning of each month.

Continuing with FIG. 1, the transaction (102a) receives a categorization (102b) from the user (120) when prompted by the FMA Interface (102c). The categorization (102b) is a field for the transaction (102a) to categorize the user's finances. In one or more embodiments of the invention, the categorization (102b) identifies the transaction (102a) as a personal transaction, business transaction, split transaction, or any other type of category that the user (120) uses to categorize a transaction. For example, categorization (102b) may be set to true if the transaction (102a) is a business expense and false if otherwise.

In one or more embodiments, the mobile payment application (102) is linked with a FMA interface (102c). The FMA interface (102c) is an extension of the FMA (105). The FMA interface (102c) is any type of software, hardware, firmware, and/or combination thereof capable of prompting the user (120), obtaining information, such as one or more categorizations (102b), from the user (120), and sending the information to the financial management application (105) via a network (110). The FMA interface (102c) is enabled by prompting the user (120) to turn on "instant categorizing." This allows the FMA interface (102c) to detect when transactions (102a) occur on the mobile device (101) or mobile payment application (102). In one or more embodiments, the FMA interface (102c) detects transactions (102a) by receiving a notification from the mobile device (101) or mobile payment application (102) that a transaction (102a) is performed by the user (120). In one or more embodiments, the FMA interface (102c) detects one or more transactions (102a) while contemporaneously prompting the user (120) to categorize the transaction (102a). Some examples of the FMA interface (102c) include a widget, a pop-up, an application, or any other method on the mobile device (101) that prompts the user (120) and receives input from the user. These are merely just a few examples, and many more examples similar to these may be used.

In one or more embodiments, the mobile device (101) includes a processor (103) and memory (104). The processor (103) contains instructions that enable the mobile device (101) to perform the functions described in accordance with one or more embodiments. The processor (103) may be an integrated circuit for processing instructions. For example, the processor may be one or more cores, or micro-cores of a processor. In one or more embodiments, the memory (104) is stored on the mobile device (101). The memory may be random access memory (RAM), cache memory, flash memory, etc.

The FMA (105), in accordance with one or more embodiments, is a software application written in any programming language that includes instructions stored in any non-transitory computer readable medium. The instructions, when executed by one or more processors, enable a device to perform the functions described in accordance with one or more embodiments. In one or more embodiments, the FMA (105) is capable of assisting the user (120) with the user's finances. For example, the FMA may be any type of financially-based application such as a tax program, a personal budgeting program, a small business financial program, or any other type of program that assists with finances. The FMA (105) includes a user interface (107) that allows for the user (120) to interact with the FMA (105). The FMA (105) may be stored and run from a mobile device (101) that contains the FMA interface (102c) or run on a separate device (not shown) than the FMA interface, as shown in FIG. 1.

In one or more embodiments, the FMA (105) receives categorizations (102b) from the FMA interface (102c) via the network (110). As previously discussed, the categorizations (102b) identify the transaction (102a) as a business transaction, a personal transaction, or a combination of both. The FMA (105) sorts the transactions identified as a business transaction (106) or a personal transaction (108) in a list that is viewed by the user. In one or more embodiments, the business transaction (106) is a transaction (102a) that has been identified as a business expense. In one or more embodiments, the business transaction (106) is any type of transaction that is related to a user owned business, a corporation, a firm, or any other type of business for which the user may work. The business transaction (106) is further described in FIG. 5. In one or more embodiments, the personal transaction (108) is a transaction (102a) that is identified as a personal expense. The personal transaction (108) is further described below.

In one or more embodiments, the business transaction (106) includes a FMA time stamp (106a) associated with the transaction. The FMA time stamp (106a) is captured by the FMA interface (102c) by using a time maintained by the mobile device (101) (or a processor (103) or memory (104)) of the mobile device (101) at the moment the transaction (102a) occurs. The FMA time stamp (106a) includes at least the time and date that the transaction took place. The FMA time stamp (106a) is further described in FIG. 5.

In one or more embodiments, the personal transaction (108) is identified by the user (120) as a personal expense or any type of expense that is unrelated to a business expense. For example, the user (120) may purchase multiple items from a store such as pens, coffee, and other items. The user (120) in this example may categorize the coffee as a personal transaction (108) as the coffee does not pertain to business. The personal transactions (108) may be sorted along with the business transactions (106) on the FMA (105) as previously discussed.

In one or more embodiments, the user interface (107) allows the user (120) to interact with the FMA (105). The user interface (107), in accordance with one or more embodiments, is a touch screen, a monitor, or any other type of screen that displays information through a graphical user interface (GUI) and allow for user feedback to the FMA (105) on a device using the same hardware and GUI. For example, the user (120) accesses the FMA (105) through the user interface (107) to view the list of business transactions (106) with their associated FMA time stamps (106a), which may be displayed alone or alongside the business transactions (106) of the user (120).

In one or more embodiments, a network (110) is used to provide interaction capability between the mobile device (101), FMA (105), and a financial institution (FI) server (115). The network (110) may be a local area network (LAN), a wide area network (WAN) such as the Internet, mobile network, or any other type of network.

In one or more embodiments, the FI server (115) is any type of data repository located at a financial institution, such as a bank, that stores financial information about the user (120) and other clients of the financial institution. The FI server (115) is any type of storage unit and/or device (e.g., a file system, database, collection of tables, or any other storage mechanism) for storing data/information. Specifically, the FI server (115) may include hardware and/or software. Further, the FI server (115) may include multiple different storage units and/or devices. The multiple different storage units and/or devices may or may not be of the same type or located at the same physical site. In one or more embodiments of the invention, the FI server (115) includes functionality to store, at least in part, pending transactions (117) and posted transactions (119).

In one or more embodiments, a FI account (116) is stored on the FI server (115). The FI account (116) is any type of account that is associated with the user (120) that stores the user's financial information such as pending transactions (117), posted transactions (119), user's credit card statements, user's account balance, or any other financial information that is associated with the user at the financial institution. For example, the FI account (116) shows a list of all the pending transactions (117) and posted transactions (119) of the user (120).

In one or more embodiments, the pending transactions (117) are any transactions performed by the user (120) that have yet to be processed by the financial institution. The transaction shows up as pending in the FI account (116). In one or more embodiments, the pending transaction (117) has a FI time stamp (117a) to identify the time and date that the transaction took place.

Figure 7A:
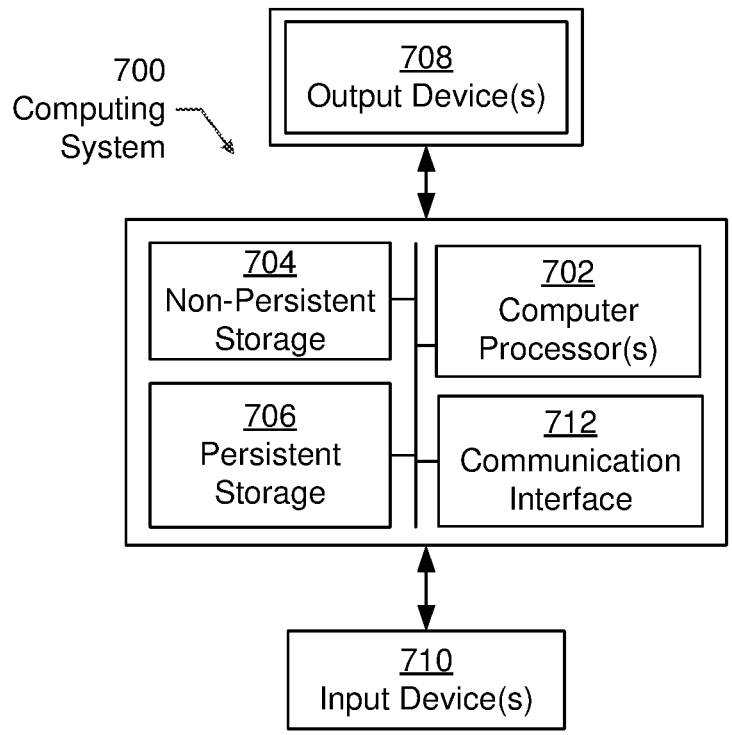
FIGS. 7A and 7B shows a computing system in accordance with one or more embodiments.
Figure 7B:
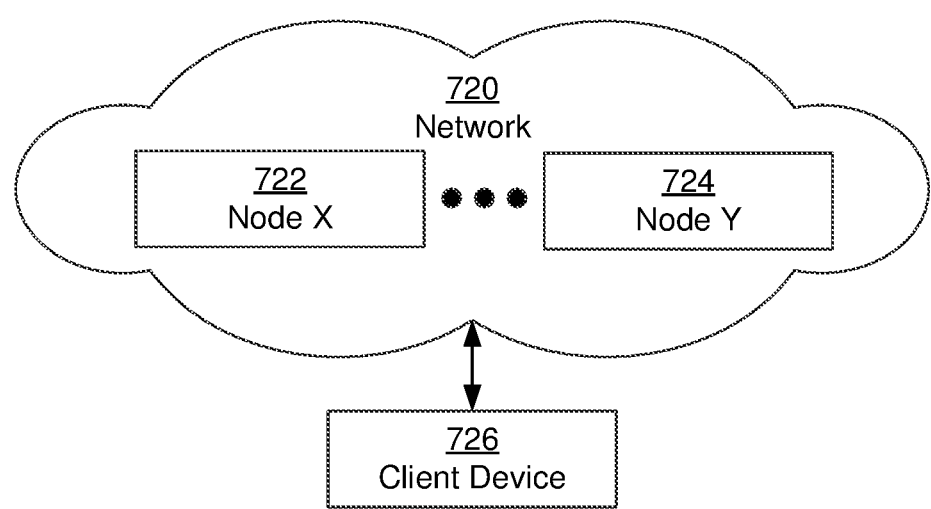

Embodiments may be implemented on one or more computing systems that may be similar to the computing system introduced in FIGS. 7A and 7B. While FIG. 1 shows a configuration of components, other configurations may be used without departing from the scope of the invention. For example, various components may be combined to create a single component. As another example, the functionality performed by a single component may be performed by two or more components that may be communicatively connected using a network connection.

Figure 2A:
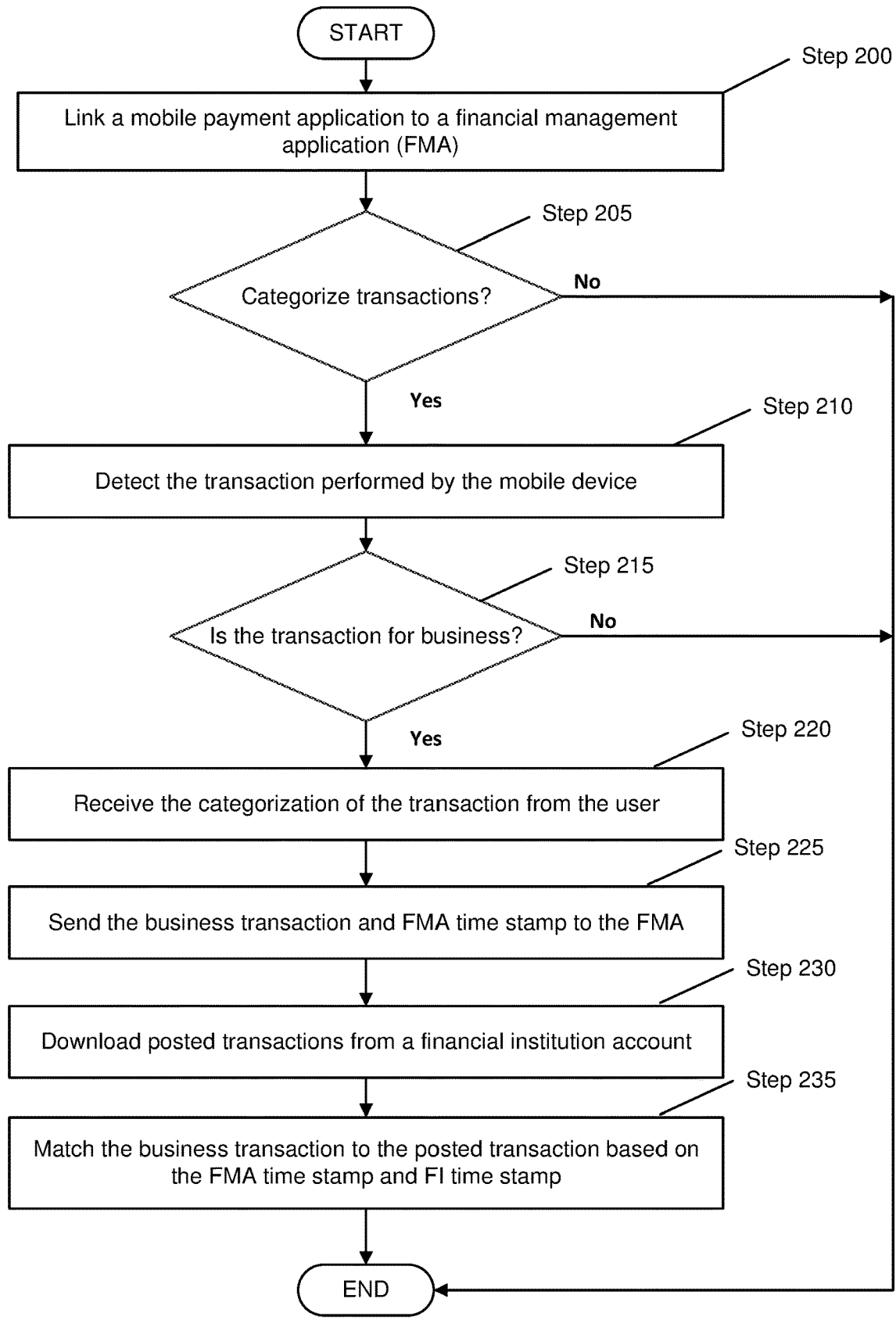
FIGS. 2A and 2B show a flowchart in accordance with one or more embodiments.
Figure 2B:
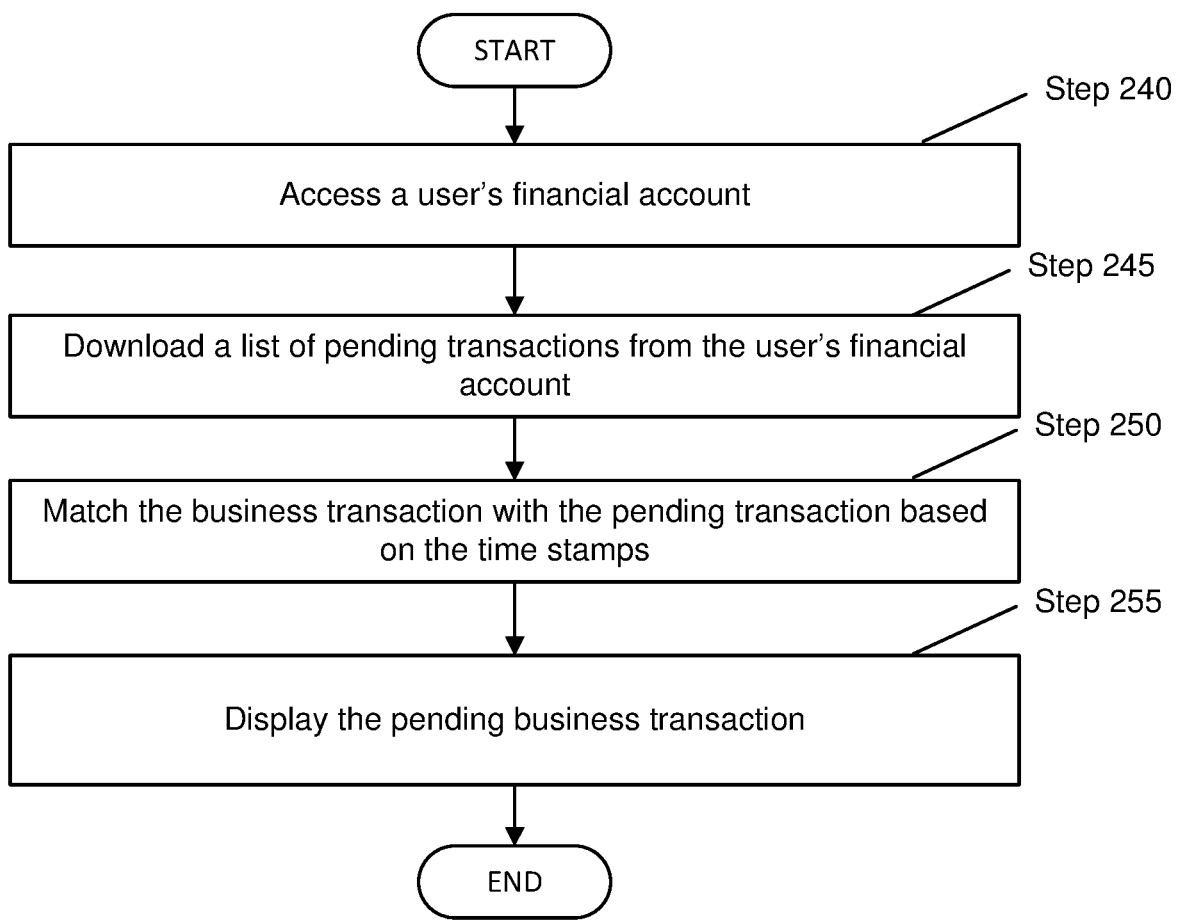

FIGS. 2A and 2B show a flowchart in accordance with one or more embodiments. While the various steps in the flowchart are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

Turning to FIG. 2A, a method for categorizing transactions at the moment-of-sale using mobile payments is shown. The method may be executed on a mobile device by the user. Steps for the method are described with reference to the exemplary illustrations show in FIGS. 3, 4, 5, and 6.

In Step 200, the user links a mobile payment application to the financial management application (FMA) interface. In one or more embodiments, the user downloads the FMA interface from a source, such as an app store, to install on the user's device. After installation, the FMA interface embeds itself into the mobile payment application with the user's permission. In one or more embodiments, the user links the FMA interface by inputting credentials into the mobile payment application. In one or more embodiments, the settings of the mobile payment application are accessed and allow the FMA interface to track payments performed by the mobile device. In one or more embodiments, the FMA contains settings to embed itself into the mobile payment application. Once a request to link the FMA and the mobile payment application has been accepted by the user, the FMA detects when a transaction takes place through the mobile payment application.

In one or more embodiments, the FMA interface is linked to an online merchant account in lieu of the mobile payment application. For example, the online merchant account may be a merchant application, a merchant website, or any other method of accessing a merchant store. Linking the FMA interface to the online merchant account allows the FMA interface to detect transactions performed via the online merchant account. The remaining steps are similar to steps shown and described in relations to FIG. 2A.

In Step 205, the user is prompted by the FMA interface for permission to categorize transactions. If the user answers "no", the FMA interface is not allowed to categorize transactions performed by the mobile payment application and the process ends. If the user answers "yes", the FMA interface is allows the user to categorize the transactions when prompted by the FMA interface.

In Step 210, the user performs a transaction using a mobile device. In one or more embodiments, the FMA interface detects that a transaction has been performed and prompts the user to act, as detailed more thoroughly in step 215. In one or more embodiments, the user performs the transaction using a mobile payment application on the mobile device. In one or more embodiments, the mobile payment application sends a notification to the FMA interface that a transaction has occurred. This notification allows the FMA interface to begin the process of prompting the user. In one embodiment, the notification may be sent from the mobile payment application by using a cloud service, push notifications, a GCM connection server, and HTTP connection server, or any other type of service that allows for notifications to be sent between separate applications.

In one or more embodiments, the mobile device is a POS device. For example, the mobile device may be a credit card swiper attached to tablet, phone, or other type of computing device. In one or more embodiments, the POS device includes the functionality to identify the user through biometric recognition. For example, the POS device may prompt the user to verify the user's identity by requiring a fingerprint scan, a retina scan, a face scan, or any other type of biometric identifying technique capable of verifying a user.

In Step 215, the FMA interface prompts the user to identify the transaction that has just occurred. In one or more embodiments, the user is prompted by the FMA interface contemporaneously with the transaction being detected by the FMA interface. The FMA interface may instantly prompt the user after a transaction, or the FMA interface may wait for the transaction to process on the mobile device before prompting the user. In one or more embodiments, the user is prompted if the transaction is a business transaction. The user is given the choice to select "yes" or "no". If the user selects "no", the process ends. If the user selects "yes", the process continues to step 220. In one or more embodiments, the user has the option to select business, personal, or split. If the user identifies the transaction as "personal", the process ends. In one or more embodiments, the user selects a split transaction where both business and personal expenses exist as part of the transaction. In this case, the user further identifies which expenses are business and which are personal. If the user identifies the transaction as "business" the process continues to Step 220.

In one or more embodiments, the user sets up a rule with the FMA interface to assist in identifying which transactions are business transactions. For example, the user may create a rule that identifies transactions from a certain merchant as a business transaction. In this case, no prompt is necessary for user input as the transaction is automatically categorized as business. In another example, the user may create a rule that identifies certain items, such as pens, as a business transaction. In this case, when the user buys pens from any merchant, the pens are automatically categorized as business and the user is prompted to identify the additional expenses if more items are purchased.

In one or more embodiments, the FMA interface is able to "learn" which transactions are business and which transactions are personal. In this case, the FMA interface uses an algorithm to determine patterns made by the user selections and categorizes the transaction based on the results of the algorithm. For example, the FMA interface may detect that the user always identifies pens as a business transaction and categorizes pens as a business transaction without user input. The algorithm may be supervised learning or unsupervised learning. For example, the user may train the algorithm by adjusting the results from the algorithm as necessary to match the user's desired option. In one or more embodiments, the user may adjust the results of the algorithm if the user needs to change a business transaction to a personal transaction.

In one or more embodiments, a second categorization is identified by the user. In addition to the user categorizing the transaction as a business, personal, or split transaction, the user further categorizes the transaction. The FMA interface further prompts the user, after the initial categorization prompt, to select a category under which the business or personal transaction falls. In one or more embodiments, the second categorization is chosen from a pre-determined list created by the FMA interface based on sub-categories from the Financial Management Application. In one or more embodiments, the second categorizations are determined by the user and saved for future use in the FMA interface. In one or more embodiments, the FMA interface "learns" the second categorization of certain items based on repeat selections by the user. This "learning" is similar to the "learning" described above. In one or more embodiments, the "learning" continues throughout the process using various inputs and information available to become more intelligent. For example, the user may identify an item as a business categorization, and the user is then further prompted to identify a second categorization. The user then identifies the business categorization as "lunch". In another example, the FMA interface determines that the user repeatedly identifies pens as a business transaction for "office supplies". The FMA interface is then able to identify the pens as "office supplies" for the second categorization without input from the user.

In Step 220, the FMA interface receives the transaction and the categorization of the transaction from the user. The FMA interface receives the transaction and attaches a FMA time stamp to the transaction. In one or more embodiments, the transaction is categorized as a business transaction by the user. In one or more embodiments, the FMA interface receives a time stamp from the mobile payment application when the mobile payment application notifies the FMA interface that a transaction has taken place. In one or more embodiments, the FMA interface creates a time stamp for the business transaction when the FMA interface receives the business transaction. In one or more embodiments, the FMA time stamp marks the time and date that the transaction took place with varying level to detail depending on the needs of the categorization system. In certain instances, the time stamp only includes minutes and seconds. In other instances, the time stamp includes minutes, second, and milliseconds for accuracy of matching the time stamps. More detail about the FMA time stamps may be found and described in relation to FIG. 5.

In one or more embodiments, the FMA interface receives the geographical location of the user at the time of the transaction via the mobile device of the user. The FMA interface stores the geographical location of the user to match it to the geographical location of the store where the transaction took place. For example, FMA interface can determine the user's geographical location via GPS on the phone and determine the full zip code of the user (e.g., 12345-1234).

In Step 225, the business transaction and the FMA time stamp are sent to the FMA via the FMA interface. In one or more embodiments, the FMA time stamp and business transaction are sent over a network from the FMA interface to the FMA if the FMA interface and FMA are used on separate devices. The FMA time stamp and business transaction may be sent over the network to a cloud server (not shown) that may access the FMA, or the FMA time stamp and business transaction may be sent over the network to the FMA directly. In one or more embodiments, the FMA time stamp and business transaction are sent from the FMA interface to the FMA directly if the FMA interface and FMA are on the same mobile device. In one or more embodiments, the business transaction is then stored in the FMA. The user is able to view the business transactions in the FMA at any time. In one or more embodiments, the user may also view the personal transactions in the FMA. In one or more embodiments, the user has the option to change the business transaction to a personal transaction or another type of transaction if the transaction was initially miscategorized. More detail about the business transaction may be found and described in relation to FIG. 5.

In Step 230, the FMA downloads the posted transactions from a financial institution (FI) account. The FI account is the user's account at a financial institution which contains all of the user's transactions including pending transactions and posted transactions. In one or more embodiments, the FMA is linked to the user's financial institution account to allow the FMA to access the user's financial information. In one or more embodiments, the FMA downloads a list of posted transactions on the FI account of the user once a day off of a FI server. In one or more embodiments, the FMA is notified by the financial institution server that new transactions have been posted. In this case, the FMA proceeds to download the newly posted transactions. In one or more embodiments, the FMA automatically downloads posted transactions a set number of times a day, which is determined by the coding of the FMA. More detail about the interaction between the FMA and the FI account is found and described in relation to FIG. 2B. In Step 235, the FMA matches the business transaction to the posted transaction based on the FMA time stamp and FI time stamp. In one or more embodiments, the FMA time stamp and the FI time stamp contain the same time and date. In one or more embodiments, the FMA time stamp and FI time stamp contain different times and dates. In this case, the FMA determines that the cost value of the posted transaction and the business transaction are similar. The FMA time stamp and FI time stamp confirm that the two transactions occurred in a similar time frame and a match is determined. For example, the FMA time stamp and FI time stamp may differ by seconds or the FMA time stamp and FI time stamp may differ by 3 seconds. In one or more embodiments, the FMA determines that the business transaction and posted transaction occurred in a similar time frame even if the two time stamps differ by 10 seconds.

In one or more embodiments, the geographic location of the posted transaction is downloaded. In this case, the FMA determines the location of the posted transaction based on the 9 digit zip code and matches it based on the stored geographic location of the transaction from the user.

Turning to FIG. 2B, a method for categorizing transactions at the moment-of-sale using mobile payments is further shown. The method narrows down on Step 230 from FIG. 2A. The method may be executed on a mobile device by the user. Steps for the method are described with reference to the exemplary illustrations show in FIGS. 3, 4, 5, and 6.

In Step 240, the FMA accesses a FI account of the user. The FI account may be a user's bank account, credit card account, savings account, or any other type of account that allows the user to access the user's finances. The FI account may be located on a financial server, a bank, or an online monetary transaction site, such as Paypal or Venmo. In one or more embodiments, the user has given permission to the FMA to access the FI account prior to beginning of the method.

In Step 245, the FMA downloads the list of the pending transactions from the FI account of the user. In one or more embodiments, the FMA receives a list of pending transactions from the FI account after the user has categorized the transaction, as detailed previously in step 215 of FIG. 2A. The pending transaction has a financial institution time stamp which is determined by the financial institution.

In Step 250, the FMA matches the business transaction with the pending transaction based on the FMA time stamp and the financial institution time stamp. In one or more embodiments, the FMA is able to match up the FMA time stamps from the business transaction with the financial institution time stamps of the pending transaction regardless if they are an exact match. For example, the FMA may have the FMA time stamp for the business transaction listed as 7:34:25 am while the financial institution time stamp received from the FI account may list the pending transaction at 7:34:32 am. While the time stamps aren't exact, the FMA may determine, either through the transaction price, lack of other transactions in a similar time frame, or any other method, that the business transaction matches the pending transaction.

In Step 255, the business transaction is displayed to the user via a user interface. In one or more embodiments, the business transaction shows a match to a pending transaction from the FI account of the user. In one or more embodiments, the user is able to view the FMA at any point to see all of the business transactions so that the user may ensure all of the transactions have been appropriately categorized. In one or more embodiments, the user may also view the personal transactions through the FMA.

Figure 3:
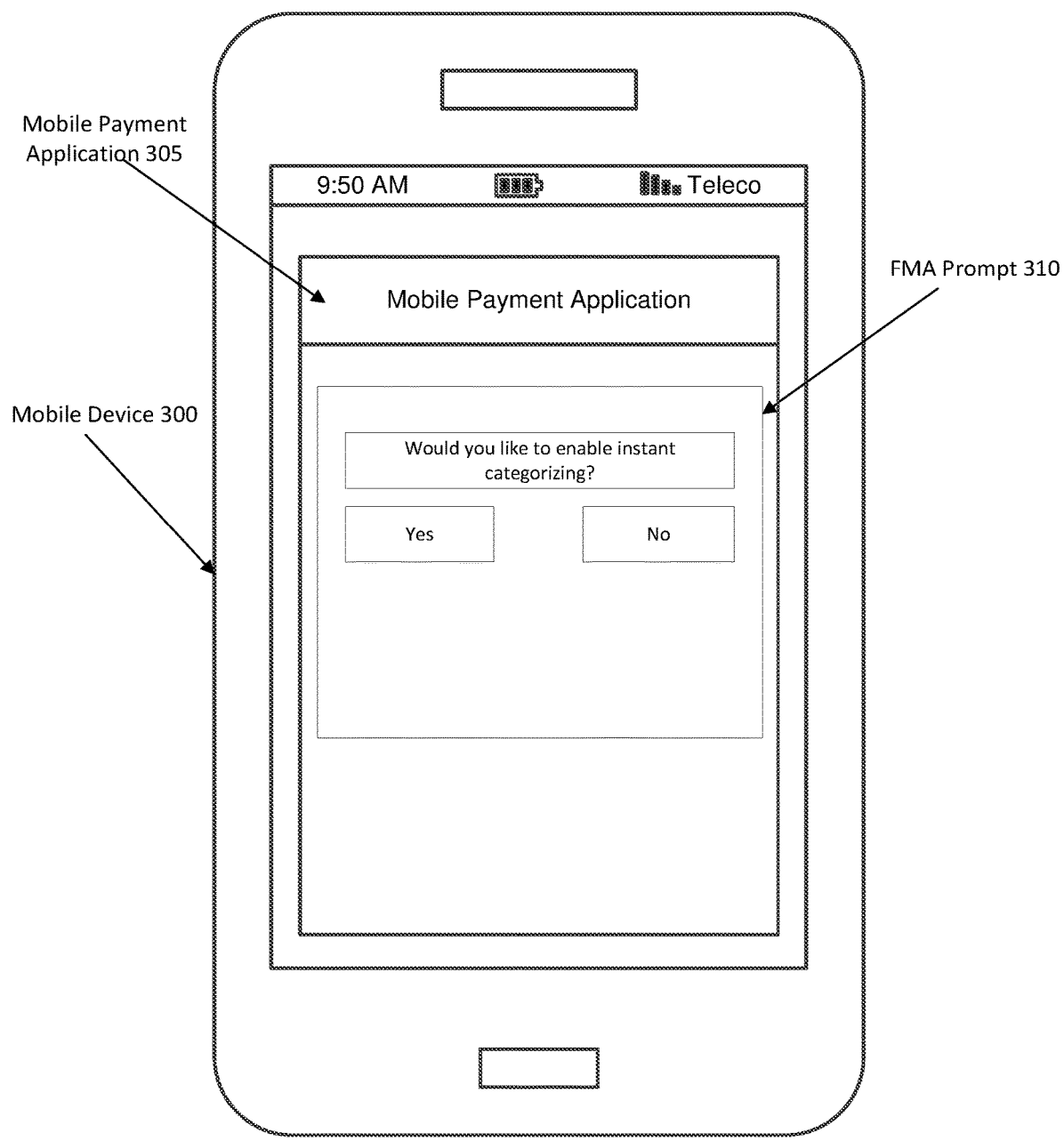

FIG. 3 shows an example of the mobile device (300) and how the mobile payment application (305) prompts the user through the FMA interface prompt (310). The following example is for explanatory purposes only and not intended to limit the scope of the invention. The example shows a general layout of mobile device (300), which includes: the mobile payment application (305) and the FMA interface prompt (310). As shown in FIG. 2, the FMA interface prompts the user to enable "instant categorizing". The user, in this example, selects to enable instant categorizing. The mobile payment application (305) receives the input and allows for the FMA interface to link with the mobile payment application (305). The linking with the mobile payment application allows the mobile payment application (305) to have access to accounts and transaction records found within the FMA (including both pending and posted transactions as well as time stamps of when the transaction occurred). In addition, the instant categorization link has access to the payment system on the mobile device (300) and includes functionality to provide the payment system information to the FMA.

Figure 4:
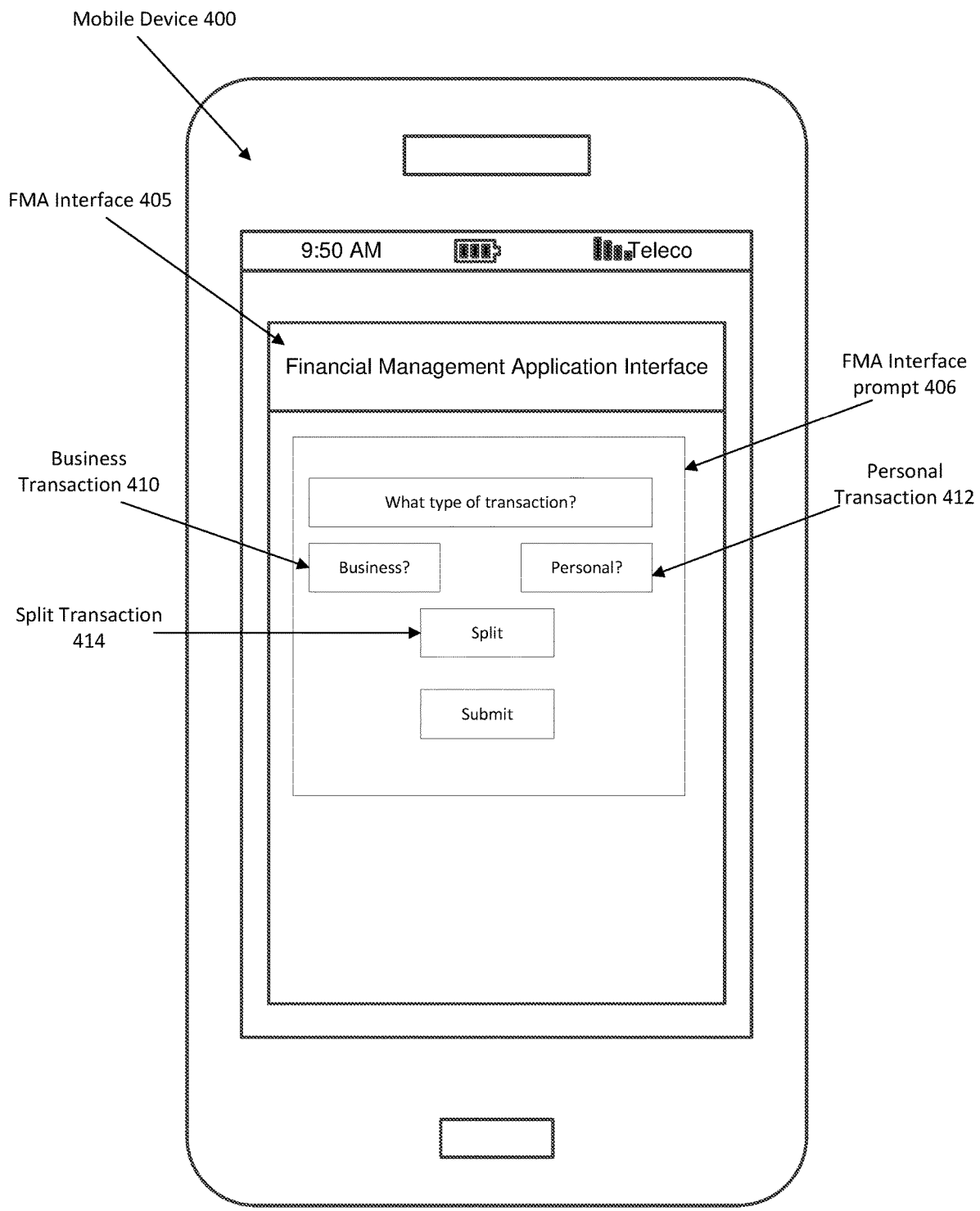

FIG. 4 shows an example of the mobile device (400) that is similar to FIG. 3. However, in this example, the FMA interface (405) detects a transaction performed by the mobile payment application and displays a FMA interface prompt (406) for the user. The FMA interface prompt (406) is displayed to the user as soon as (or at least contemporaneously with) a transaction is detected by the FMA interface (405). This functionality allows the user to contemporaneously categorize the transaction as soon as the transaction occurs on the mobile device (400). The FMA interface prompt (406) displays three options for the user to select in this example: business transaction (410), personal transaction (412), and split transaction (414). The user selects business transaction (410) if the recent transaction is a business expense, personal transaction (412) if the recent transaction is a personal expense, and split transaction (414) if the recent transaction is a combination of personal and business expenses. The FMA interface (405) receives the categorization from the user and sends the input to the Financial Management Application (not shown) if the categorization is a business transaction (410) or a split transaction (414) with business expenses. In this example, the process ends if the user selects personal transaction (412). While FIG. 4 displays a prompt to categorize the type of transaction, the prompt may also ask if the transaction is a business transaction. In this case, the user is prompted to answer yes or no.

Figure 5:
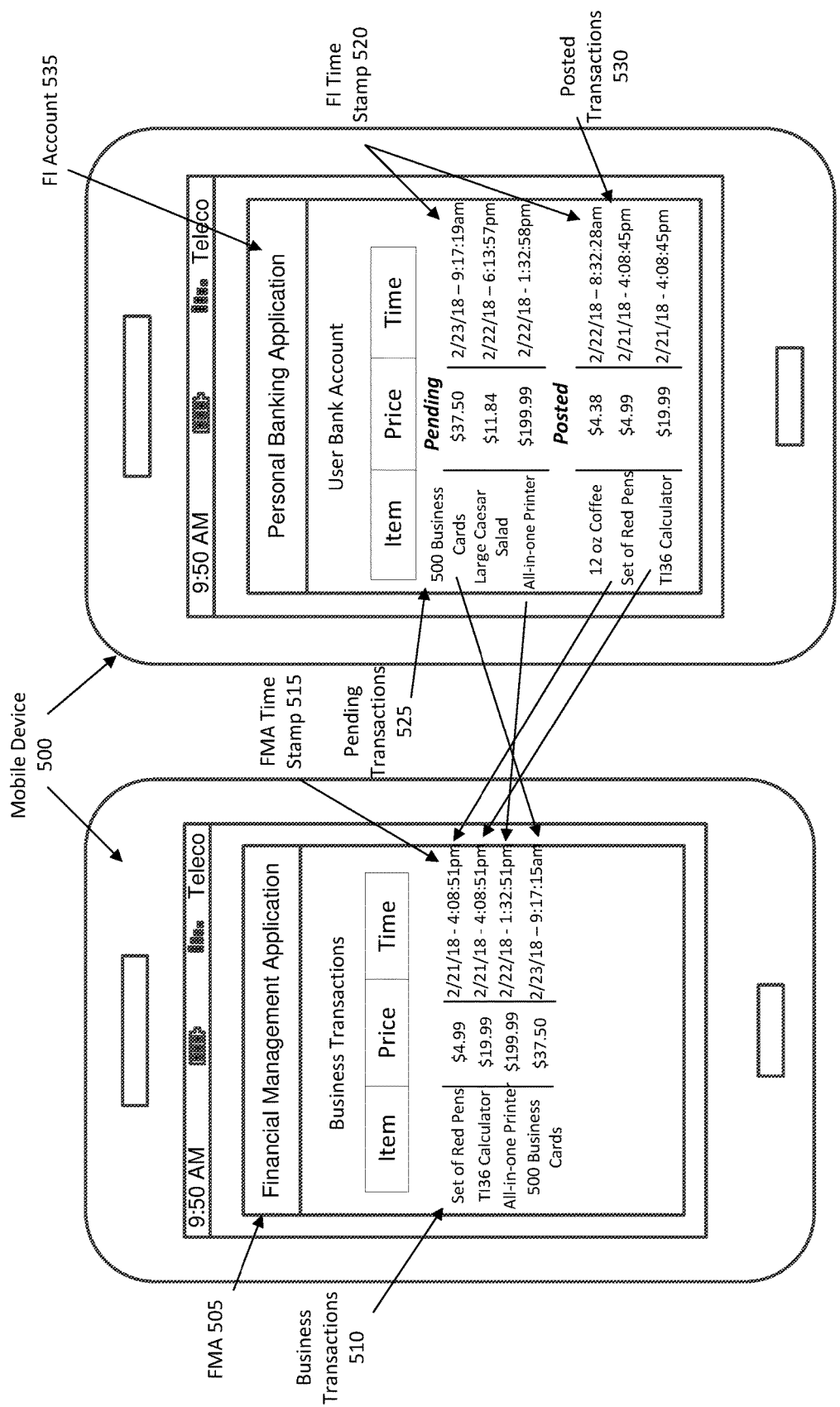

FIG. 5 shows an example portraying how the posted transactions (525) are linked to the business transactions (510). The mobile device (500) in this example is similar to and includes essentially the same functionality as the mobile device (500) in FIGS. 3 and 4. The FMA (505) displays a list of all of the business transactions (510) with associated FMA time stamps (515). In this example, the user identifies "set of red pens", "TI36 calculator", "All-in-one printer", and "500 business cards" as business expenses.

The mobile device (500) also shows the FI account (535) of the user on the user's personal banking application. The FI account (535) displays all of the user's pending transactions (525) and posted transactions (530). In this example, the user has three pending transactions (525) with the bank: "500 business cards", "Large Caesar salad", and "All-in-one printer". Each of these pending transactions (525) has an associated FI time stamp (520) and a price. The user also has three posted transactions (530), which means the bank has processed and cleared these transactions. The posted transactions (530) are: "12 oz. coffee", "set of red pens", and "TI36 calculator". As shown, the posted transactions contain a FI time stamp (520) and price. The pending transactions (525) and posted transactions (530) are a culmination of all the users expenses made through the FI account (535) of the user, which means the FI account (535) contains a mix of both personal and business transactions.

In this example, the FMA (505) is in the process of downloading the posted transactions (530) from the FI account (535) of the user. The FMA (505) determines that two business transactions (510) match two of the posted transactions (530) based on the fact that the FMA time stamps (515) are similar to the FI time stamps (520). In this example, both transactions took place on Feb. 21, 2018. The FMA time stamp (515) shows the transactions took place at 4:08:51 pm and the FI time stamp shows the transactions took place at 4:08:45 pm. The FMA (505) determines that because these business transactions (510) and posted transactions (530) took place in a similar time frame and have similar pricing, the posted transactions (530) match the business transactions (510). The FMA (505) also determines a match exists between two of the other business transactions (510) and two of the pending transactions (525). In this example, the "all-in-one printer" has a time stamp of Feb. 22, 2018 at 1:32:51 pm, which matches the pending transaction (525) that took place on Feb. 22, 2018 at 1:32:58 pm. Additionally, the "500 business cards" has a FMA time stamp (515) of Feb. 23, 2018 with a time stamp of 9:17:15 am, which matches to the newest pending transaction (525) that takes place on Feb. 23, 2018 at 9:17:19 am.

FIG. 6 shows an example of a mobile device (600) that shows the results of the transaction matching. The mobile device (600) shown in FIG. 6 and used in this example is essentially similar in functionality to the mobile device shown and described in FIGS. 3, 4, and 5. The FMA (605) displays all of the business transactions (610) from the example shown in FIG. 5. Since the "set of red pens" and "TI36 calculator" have matches from the posted transactions from the FI account, these two items are shown with check marks (615). The check marks (615) represent that the business transaction is posted successfully in the FI account. The user is able to view the FMA (605) at any time to check on the status of the business transactions (610) to ensure no unnecessary delays exist within the FI account.

Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below. Based on the client-server networking model, sockets may serve as interfaces or communication channel end-points enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the mobile device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the mobile device in response to the user's selection.

By way of another example, a request to obtain data regarding the particular item may be sent to a server operatively connected to the mobile device through a network. For example, the user may select a uniform resource locator (URL) link within a web client of the mobile device, thereby initiating a Hypertext Transfer Protocol (HTTP) or other protocol request being sent to the network host associated with the URL. In response to the request, the server may extract the data regarding the particular selected item and send the data to the device that initiated the request. Once the mobile device has received the data regarding the particular item, the contents of the received data regarding the particular item may be displayed on the mobile device in response to the user's selection. Further to the above example, the data received from the server after selecting the URL link may provide a web page in Hyper Text Markup Language (HTML) that may be rendered by the web client and displayed on the mobile device.

Once data is obtained, such as by using techniques described above or from storage, the computing system, in performing one or more embodiments, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 7A, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
  detecting, via an interface for a financial management application (FMA), a transaction performed on a mobile device by a payment application accessible by the mobile device, wherein:
    the payment application is logically distinct from the FMA,
    the interface is stored on the mobile device and linked to the payment application,
    the interface detects the transaction by receiving a notification from at least one of the mobile device and the payment application,
    the interface is an extension of the FMA, and
    the FMA is remote from the mobile device;
  prompting, via the interface, a user of the mobile device to provide a categorization of the transaction as a business transaction or a personal transaction, wherein:
    prompting is performed contemporaneously with detecting, and
    the transaction is categorized by the user contemporaneously with the transaction being detected by the interface;
  receiving the transaction and the categorization of the transaction from the user, wherein the transaction comprises a FMA time stamp;
  sending, to the FMA via the interface, the FMA time stamp of the transaction with the categorization as the business transaction; and
  matching the FMA time stamp of the business transaction to a financial institution time stamp of a pending transaction.

2. The method of claim 1, further comprising:
  sorting the transactions on the FMA as the business transactions and the personal transactions;
  downloading posted transactions containing a financial institution time stamp from a financial institution account of a user on a financial institution server;
  receiving the posted transactions with the financial institution time stamps from the financial institution server; and
  matching the FMA time stamp of the business transaction to the financial institution time stamp of the posted transaction.

3. The method of claim 1, further comprising:
  learning, via the interface, the categorization of the transaction based on a pattern of user selections, wherein the transaction receives categorization from the interface.

4. The method of claim 1, further comprising:
  linking an online merchant with the interface to further detect the transaction.

5. The method of claim 4, further comprising:
  creating a rule, via the user through the interface, to categorize the transaction based on the online merchant, wherein the transaction receives categorization from the interface.

6. The method of claim 1, further comprising:
  categorizing the transaction with a second categorization from the user, wherein the second categorization is input by the user.

7. The method of claim 6, further comprising:
  learning, via the interface, the second categorization of the transaction based on a pattern of user selections, wherein the transaction receives the second categorization from the interface.

8. A system comprising:
  a processor configured to access a memory;
  a financial management application (FMA) stored in the memory, executing on the processor, and comprising functionality to:
    detecting, via an interface located on a mobile device, a transaction performed on the mobile device by a payment application accessible by the mobile device, wherein:
      the payment application is logically distinct from the FMA,
      the interface is linked to the payment application, the interface detects the transaction by receiving a notification from at least one of the mobile device and the payment application, and the interface is an extension of the FMA;

prompting, via the interface, a user of the mobile device to provide a categorization of the transaction as a business transaction or a personal transaction, wherein:

prompting is performed contemporaneously with detecting, and the transaction is categorized by the user contemporaneously with the transaction being detected by the interface;

receive the transaction and the categorization of the transaction from the user, wherein the transaction comprises a FMA time stamp;

send, to the FMA via the interface, the FMA time stamp of the transaction with the categorization as the business transaction; and match the FMA time stamp of the business transaction to a financial institution time stamp of a pending transaction.

9. The system of claim 8, further comprising:

sorting the transactions on the FMA as the business transactions and the personal transactions;

downloading posted transactions containing a financial institution time stamp from a financial institution account of a user on a financial institution server;

receiving the posted transactions with the financial institution time stamps from the financial institution server;

matching the FMA time stamp of the business transaction to the financial institution time stamp of the posted transaction.

10. The system of claim 8, further comprising:

learning, via the interface, the categorization of the transaction based on a pattern of user selections, wherein the transaction receives categorization from the interface.

11. The system of claim 8, further comprising:

linking an online merchant with the interface to further detect the transaction.

12. The system of claim 11, further comprising:

creating a rule, via the user through the interface, to categorize the transaction based on the online merchant, wherein the transaction receives categorization from the interface.

13. The system of claim 8, further comprising:

categorizing the transaction with a second categorization from the, wherein the second categorization is input by the user.

14. The system of claim 13, further comprising:

learning, via the interface, the second categorization of the transaction based on a pattern of user selections, wherein the transaction receives the second categorization from the interface.

15. A non-transitory computer readable medium comprising instructions to:

detect via an interface for a financial management application (FMA), a transaction performed on a mobile device by a payment application accessible by the mobile device, wherein:

the payment application is logically distinct from the FMA, the interface is stored on the mobile device and linked to the payment application, the interface detects the transaction by receiving a notification from at least one of the mobile device and the payment application, the interface is an extension of the FMA, and the FMA is remote from the mobile device;

prompt, via the interface, a user of the mobile device to provide a categorization of the transaction as a business transaction or a personal transaction, wherein:

prompting is performed contemporaneously with detecting, and the transaction is categorized by the user contemporaneously with the transaction being detected by the interface;

receive the transaction and the categorization of the transaction from the user, wherein the transaction comprises a FMA time stamp; and send, to the FMA via the interface, the FMA time stamp of the transaction with the categorization as the business transaction; and match the FMA time stamp of the business transaction to a financial institution time stamp of a pending transaction.

16. The non-transitory computer readable medium of claim 15, further comprising:

sorting the transactions on the FMA as the business transactions and the personal transactions;

downloading posted transactions containing a financial institution time stamp from a financial institution account of a user on a financial institution server;

receiving the posted transactions with the financial institution time stamps from the financial institution server; and matching the FMA time stamp of the business transaction to the financial institution time stamp of the posted transaction.

17. The non-transitory computer readable medium of claim 15, further comprising:

matching the FMA time stamp of the business transaction to the financial institution time stamp of the posted transaction;

learning, via the interface, the categorization of the transaction based on a pattern of user selections, wherein the transaction receives categorization from the interface.

18. The non-transitory computer readable medium of claim 15, further comprising:

linking an online merchant with the interface to further detect the transaction.

19. The non-transitory computer readable medium of claim 18, further comprising:

creating a rule, via the user through the interface, to categorize the transaction based on the online merchant, wherein the transaction receives categorization from the interface.

20. The non-transitory computer readable medium of claim 15, further comprising:

categorizing the transaction with a second categorization from the, wherein the second categorization is input by the user.

\* \* \* \* \*